United States Patent
Kim et al.

(10) Patent No.: US 11,374,277 B2
(45) Date of Patent: Jun. 28, 2022

(54) SECONDARY BATTERY PACK

(71) Applicant: LG CHEM, LTD., Seoul (KR)

(72) Inventors: Do-Hyeon Kim, Daejeon (KR);
Tae-Young Kang, Daejeon (KR);
Hwa-Joong Kim, Daejeon (KR);
Duck-Hee Moon, Daejeon (KR);
Jun-Yeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 353 days.

(21) Appl. No.: 15/735,324

(22) PCT Filed: Nov. 2, 2016

(86) PCT No.: PCT/KR2016/012527
§ 371 (c)(1),
(2) Date: Dec. 11, 2017

(87) PCT Pub. No.: WO2017/104968
PCT Pub. Date: Jun. 22, 2017

(65) Prior Publication Data
US 2018/0175342 A1    Jun. 21, 2018

(30) Foreign Application Priority Data
Dec. 18, 2015 (KR) .......................... 10-2015-0181751

(51) Int. Cl.
*H01M 50/20* (2021.01)
*H01M 50/543* (2021.01)
(Continued)

(52) U.S. Cl.
CPC ......... *H01M 50/20* (2021.01); *H01M 10/045* (2013.01); *H01M 50/271* (2021.01); *H01M 50/543* (2021.01)

(58) Field of Classification Search
None
See application file for complete search history.

(56) References Cited

U.S. PATENT DOCUMENTS 9,515,431 B2    12/2016    Kim et al.
2013/0062098 A1    3/2013    Ikeda et al.
(Continued)

FOREIGN PATENT DOCUMENTS

CN    103000856 A    3/2013
CN    103958104 A    7/2014
(Continued)

OTHER PUBLICATIONS

International Search Report (PCT/ISA/210) issued in PCT/KR2016/012527, dated Feb. 28, 2017.

*Primary Examiner* — Dustin Q Dam
(74) *Attorney, Agent, or Firm* — Birch, Stewart, Kolasch & Birch, LLP (57) ABSTRACT

A secondary battery pack according to an aspect of the present disclosure includes: a cell assembly including a plurality of secondary batteries; a pack case having an internal space for accommodating the cell assembly; an electrode terminal connected to the cell assembly and protruding to the outside of the pack case; and a terminal cover configured to cover an upper portion and partial side surfaces of the electrode terminal, and to be detachable from the pack case by including a hooking protrusion that is hook-coupled to and released from a stopper that is provided in the pack case. In particular, the terminal cover further includes a jig hole configured to allow a cover separating jig to be inserted from outside to inside, and the hooking protrusion is provided at an internal area of the terminal cover to be released from the stopper when the cover separating jig inserted through the jig hole pushes the hooking protrusion.

16 Claims, 7 Drawing Sheets

(51) Int. Cl.
*H01M 50/271* (2021.01)
*H01M 10/04* (2006.01)

(56) References Cited

U.S. PATENT DOCUMENTS

| | | |
|---|---|---|
| 2013/0101362 A1 | 4/2013 | Dyer et al. |
| 2015/0236326 A1 | 8/2015 | Kim et al. |
| 2016/0056425 A1 | 2/2016 | Kim et al. |
| 2016/0336577 A1 | 11/2016 | Eom et al. |

FOREIGN PATENT DOCUMENTS

| | | | | |
|---|---|---|---|---|
| CN | 104704649 A | 6/2015 | | |
| CN | 105074954 A | 11/2015 | | |
| EP | 0606850 A2 * | 7/1994 | ............ | H01M 2/34 |
| JP | 10-208719 A | 8/1998 | | |
| JP | 2014-231132 A | 12/2014 | | |
| KR | 10-1003962 B1 | 12/2010 | | |
| KR | 20-2012-0001134 U | 2/2012 | | |
| KR | 10-2014-0013241 A | 2/2014 | | |
| KR | 10-2015-0086925 A | 7/2015 | | |
| KR | 10-2015-0136842 A | 12/2015 | | |

* cited by examiner

SECONDARY BATTERY PACK

TECHNICAL FIELD

The present disclosure relates to a secondary battery pack including a plurality of secondary batteries, and more particularly, to a secondary battery pack configured to cover an electrode terminal to reduce exposure to the outside and also to allow a connection member to be connected to the electrode terminal.

The present application claims priority to Korean Patent Application No. 10-2015-0181751 filed on Dec. 18, 2015 in the Republic of Korea, the disclosure of which is incorporated herein by reference.

BACKGROUND ART

Recently, secondary batteries have been widely used in a medium and/or large-scale device such as a vehicle and a power storage device, as well as a small device such as a portable electronic device. In particular, since carbon-based energy is gradually depleted and concern about environment has been increasing, hybrid cars and electric vehicles are being highlighted worldwide including USA, Europe, Japan, and Korea.

In hybrid cars or electric vehicles, the most important component is a secondary battery pack providing a motor of a vehicle with a driving power. Since a driving power of a hybrid car or an electric vehicle is obtained through charging/discharging of a secondary battery pack, the hybrid car or the electric vehicle has various advantages in various aspects, for example, excellent mileage, no discharge or reduced discharge of pollution materials, etc., and thus, people using the hybrid car or the electric vehicle have been increasing.

A secondary battery pack of a hybrid car or an electric vehicle includes a plurality of secondary batteries, and the plurality of secondary batteries are connected to one another in series or in parallel to improve capacity and output. A general secondary battery pack including the above secondary battery pack for a vehicle includes a cell assembly in which a plurality of secondary batteries are stacked and a pack case accommodating the cell assembly therein. Also, in order to use such a secondary battery pack, the secondary battery pack has to be electrically connected to an external device via a connection member such as a connecting wire or a bus bar, and to do this, the secondary battery pack may include an electrode terminal. In particular, the electrode terminal is likely to protrude from the pack case to an outer part and be exposed in order to be easily coupled to the connection member. Therefore, an end of the connection member is coupled in contact with the electrode terminal and the other end is connected to an external device, e.g., a motor, in a state of extending from the end via an electric wire, and thus, a driving power may be supplied from a battery pack to the motor.

However, there are some problems when an electrode terminal of a secondary battery pack is exposed to an outer part of a pack case. For example, a conductive material such as a bolt, a piece of metal, or an electric wire may contact the electrode terminal, and in this case, an external short-circuit may occur. In addition, the contact of the conductive material may cause damage on the battery pack or an electric system, and moreover, may generate spark that results in fire. Therefore, to address the above problems, there have been attempts to reduce or remove the exposure of the electrode terminal, and a configuration of connecting a connecting wire to the electrode terminal and then covering an outer part of the electrode terminal with a terminal cover is a representative method.

Such a terminal cover is detachably mounted on a pack case in order to perform a rewiring of the electrode terminal and the connecting wire and maintenance while protecting the electrode terminal. As an example, the terminal cover may have a restrictively exposed side surface so as to allow a connecting wire to access, and may be configured to be mounted on an upper surface of the pack case in a bolting manner or a hook manner.

However, according to the bolting manner that is applied to mounting of the terminal cover according to the related art, although a coupling force may be excellent, a bolt has to be fastened and loosened repeatedly and the bolt is likely to contact the electrode terminal during disassembling and assembling processes. On the other hand, according to the hook manner, an assembling process may be simpler and safer than the bolting manner, but a coupling force is weak and an excessive power that may be applied in the disassembling and assembling processes may unintentionally break components.

DISCLOSURE

Technical Problem

The present disclosure is designed to solve the problems of the related art, and therefore the present disclosure is directed to providing a secondary battery pack capable of minimizing an exposure of an electrode terminal to ensure safety and implementing a robust coupling of a terminal cover while enabling easy attachment and detachment of the terminal cover.

The other objects and advantages of the present disclosure will be apparent from the following description and the exemplary embodiments of the present disclosure. Also, it will be readily understood that the objects and advantages of the present disclosure are realized by the means and combinations thereof set forth in the appended claims.

Technical Solution

In one aspect of the present disclosure, there is provided a secondary battery pack including: a cell assembly including a plurality of secondary batteries; a pack case having an internal space for accommodating the cell assembly; an electrode terminal connected to the cell assembly and protruding to the outside of the pack case; and a terminal cover configured to cover an upper portion and partial side surfaces of the electrode terminal, and to be detachable from the pack case by including a hooking protrusion that is hook-coupled to and released from a stopper that is provided in the pack case.

In particular, the terminal cover may further include a jig hole configured to allow a cover separating jig to be inserted from outside to inside, and the hooking protrusion may be provided at an internal area of the terminal cover to be released from the stopper when the cover separating jig inserted through the jig hole pushes the hooking protrusion.

The pack case may include a terminal cover mounting part having a square-shaped upper surface and four corners, at least one of which is depressed, the electrode terminal may be located on the terminal cover mounting part, and the terminal cover may be coupled to the terminal cover mounting part.

The terminal cover mounting part may include a through hole provided in a vertical direction so that the electrode terminal protrudes to the outside, and the terminal cover may include an upper plate covering an upper portion of the electrode terminal, and side plates partially covering side surfaces of the electrode terminal.

The hooking protrusion may extend downward from the upper plate of the terminal cover, and the stopper may be partially depressed inward from a wall surface of the terminal cover mounting part.

The stopper comprises two stoppers, respectively on two crossing wall surfaces of the terminal cover mounting part, and the hooking protrusion comprises two hooking protrusions corresponding to the two stoppers and the two hooking protrusions may be hook-coupled to the two stoppers in different directions.

The hooking protrusion and the stopper may be configured to be vertically hook-coupled to each other.

An inclined surface that guides the hooking protrusion downward to be hook-coupled to the stopper may be formed on an upper part of the stopper.

The hooking protrusion may include: a supporter spaced a predetermined distance from the stopper in a transverse direction and extending perpendicularly downward from the upper plate of the terminal cover; and a coupling portion curved upward from an end of the supporter in a direction towards the stopper to contact the stopper, and the jig hole may be located above the coupling portion.

The jig hole may be formed in the upper plate to be inclined by a predetermined angle with respect to a vertical direction.

The terminal cover mounting part may include at least one of a protrusion and a groove, and the terminal cover may include at least one of a groove and a protrusion corresponding to the terminal cover mounting part.

The terminal cover may include a concave portion formed by depressing a corner where the two side plates cross each other into an internal area of the terminal cover, and the terminal cover mounting part may include an internal column located at an internal area of the terminal cover based on the concave portion to support the upper plate of the terminal cover, and an external column provided to be inserted in the concave portion in a longitudinal direction from an outer part of the terminal cover.

The electrode terminal may include a positive electrode terminal and a negative electrode terminal, and the terminal cover comprises two terminal covers respectively covering the positive electrode terminal and the negative electrode terminal.

The cover separating jig may include a head and a compressor extending from the head and having a smaller cross-sectional area than the head, and the jig hole may be equal to or greater than a cross-sectional area of the compressor and smaller than a cross-sectional area of the head.

In another aspect of the present disclosure, there is also provided a vehicle including the above-described secondary battery pack.

Advantageous Effects

According to an aspect of the present disclosure, a pack case and a terminal cover may be easily attached to and detached from each other when comparing with the related art, and also a coupling force may be relatively improved, and thus safety of a secondary battery pack may be improved.

In particular, when the terminal cover is separated from the pack case, the terminal cover may be configured to be separated from the pack case when an additional cover separating jig is pushed into a jig hole to a predetermined depth, and thus, anyone may accurately apply a power of an appropriate degree to a hook coupling part and the terminal cover may be safely separated from the pack case without breaking components.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
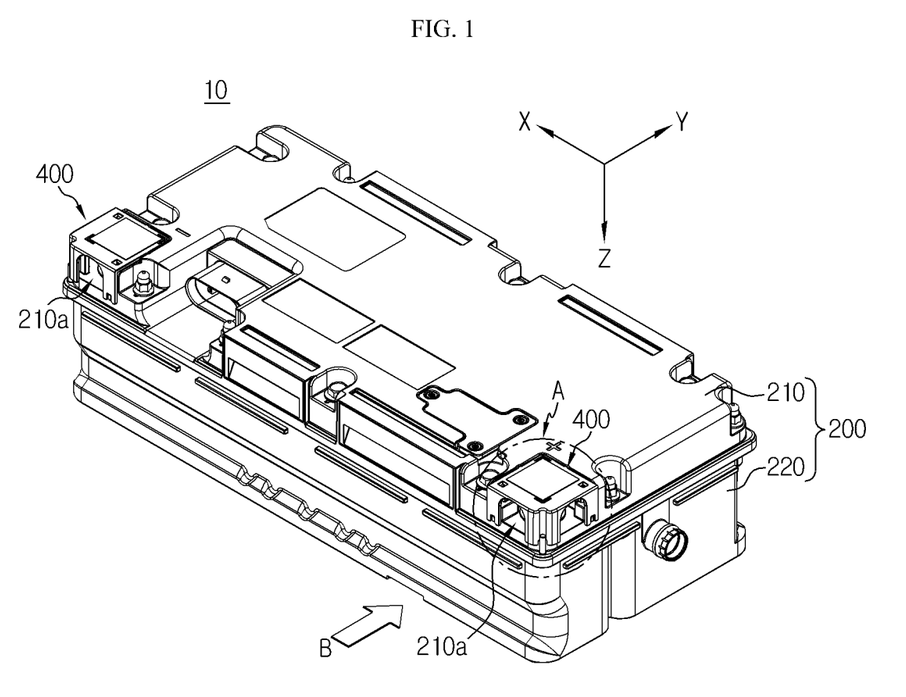
FIG. 1 is an assembled perspective view schematically showing a configuration of a secondary battery pack according to an embodiment of the present disclosure.
Figure 2:
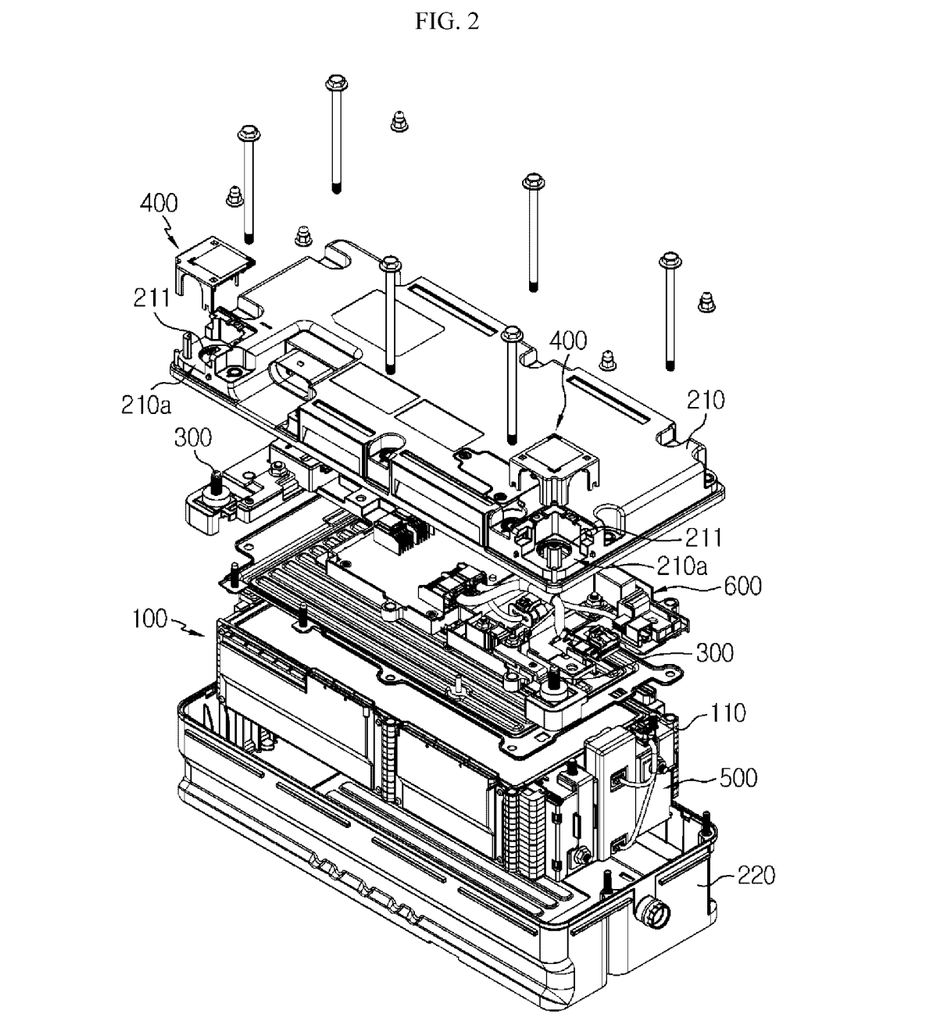
FIG. 2 is a partially exploded perspective view of FIG. 1.
Figure 3:
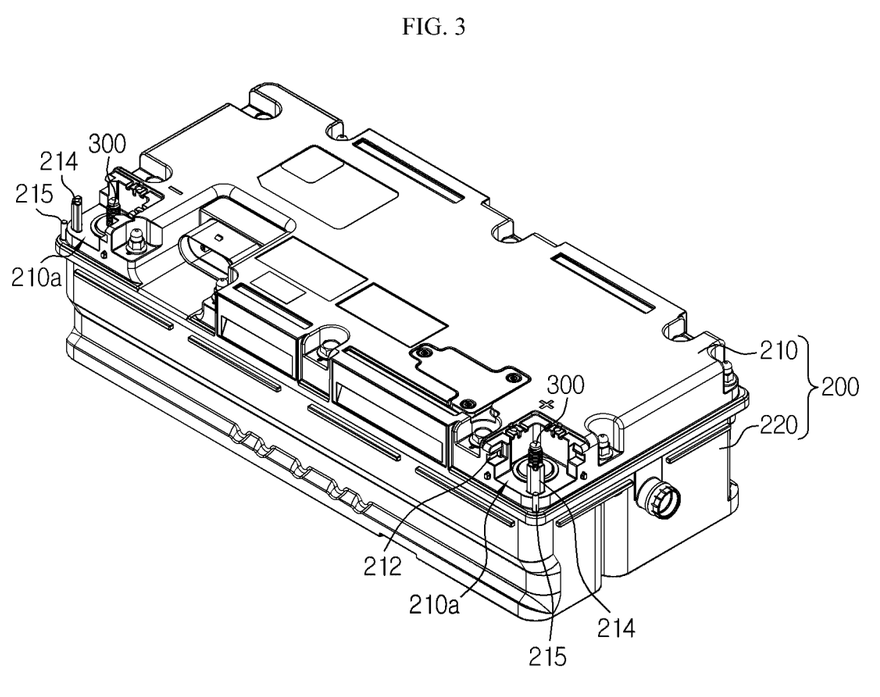
FIG. 3 is a diagram showing a state in which a terminal cover is removed in FIG. 1.

FIG. 1 is an assembled perspective view schematically showing a structure of a secondary battery pack according to an embodiment, FIG. 2 is a partially exploded perspective view of FIG. 1, and FIG. 3 is a diagram showing a state in which a terminal cover is removed from a state of FIG. 1.

Referring to FIGS. 1 to 3, a secondary battery pack 10 according to the present disclosure includes a cell assembly 100, a pack case 200, an electrode terminal 300, and a terminal cover 400.

The cell assembly 100 includes one or more secondary batteries. In particular, in the secondary battery pack 10, the cell assembly 100 may be an assembly including a plurality of secondary batteries. Here, the plurality of secondary batteries may be pouch type secondary batteries. In this case, the pouch type secondary batteries may be configured to be stacked in a direction, e.g., in an up-and-down direction.

In addition, the cell assembly 100 may further include a stacking frame 110. The stacking frame 110 is an element used to stack the secondary batteries, and holds the secondary batteries to prevent the secondary batteries from moving and is configured to be stackable to guide assembling of the secondary batteries. The stacking frame 110 may be expressed in other various terms such as a cartridge, etc., and may be configured as a square ring having empty center portion. In this case, four corners of the stacking frame 110 may be respectively located at an outer circumference of the pouch type secondary battery.

In the present embodiment, the secondary battery pack 10 may further include a sensing unit 500 and electrical equipment 600.

The sensing unit 500 transmits sensing information about electric characteristics such as a voltage of the secondary battery to a device such as BMS. The BMS may control the secondary batteries based on voltage information transmitted from the sensing unit 500. The sensing unit 500 may be mounted on the stacking frames 110 as shown in FIG. 2, so as to be electrically connected to electrode leads of the plurality of secondary batteries.

The electrical equipment 600 may include at least one of a BMS, a current sensor, a relay, and a fuse. Here, the BMS (battery management system) is a secondary battery management device that controls overall charging/discharging operations of the secondary battery pack 10. The BMS is an element generally included in the secondary battery pack 10. Also, a current sensor is an element for sensing charging/discharging currents of the secondary battery pack 10, and a relay is a switching component for selectively opening/closing charging/discharging current paths through which charging/discharging currents of the secondary battery pack 10 flow. A fuse is provided on the charging/discharging paths of the secondary battery pack 10 and blocks flow of the charging/discharging currents when an abnormal situation occurs in the secondary battery pack 10. The current sensor, the relay, and the fuse may exchange information with the BMS, and may be controlled by the BMS. The above electrical equipment 600 may be arranged on an upper portion of the stacking frames 110.

The pack case 200 includes an internal space that is empty therein to accommodate the cell assembly 100, the sensing unit 500, and the electrical equipment 600 in the internal space. The pack case 200 may function as an exterior material of the secondary battery pack 10, and thus, the pack case 200 provides structural stability to the secondary battery pack 10 and protects the components such as the cell assembly 100 accommodated therein against external physical elements such as shock, impurities, etc.

In addition, the pack case 200 may include a lower case 220 and an upper case 210, as shown in FIGS. 1 to 3. Here, the lower case 220 may have an open upper portion and an accommodation space therein, and the upper case 210 may be configured to cover the open upper portion of the lower case 220. In addition, the lower case 220 and the upper case 210 may be coupled to each other when boundaries thereof are coupled to each other via a coupling member such as a bolt.

In the present embodiment, the pack case 200 has a square-shaped upper surface, two of four corners of which include terminal cover mounting parts 210*a* that are depressed from the upper surface of the pack case 200.

As shown in FIGS. 2 and 3, the terminal cover mounting parts 210*a* are provided at the outermost corners on an upper surface of the upper case 210, and thus, the terminal cover mounting part 210*a* may have open outer surfaces and inner side surfaces surrounded by wall surfaces having a predetermined height.

In addition, the terminal cover mounting part 210*a* includes a through hole 211 formed in a longitudinal direction. The pack case of the present embodiment may be configured so that the electrode terminal 300 may expose to an outer part of the upper case 210 via the through hole 211 of the terminal cover mounting part 210*a* when the upper case 210 and the lower case 220 are coupled to each other.

The electrode terminal 300 is connected to the cell assembly 100 to provide a terminal that allows the cell assembly 100 to be electrically connected to an external device. In more detail, the electrode terminal 300 may be directly or indirectly connected to electrode leads of the secondary batteries included in the cell assembly 100. For example, the electrode terminal 300 may be electrically connected to the electrode lead of the secondary battery via a bus bar.

Also, the electrode terminal 300 may be exposed to the outer part of the pack case 200 as described above, in a state of connecting to the cell assembly 100. Two electrode terminals 300 may be included in the secondary battery pack 10. Here, one electrode terminal 300 may function as a positive electrode terminal and the other electrode terminal 300 may function as a negative electrode terminal. That is, the electrode terminal 300 may include a positive electrode terminal and a negative electrode terminal, and in this case, the positive electrode terminal is connected to a positive electrode lead of the secondary battery included in the cell assembly 100 and the negative electrode terminal may be connected to a negative electrode lead of the secondary battery. Preferably, the electrode terminal 300 may protrude as shown in the drawing.

According to the configuration of the present disclosure, when a bus bar or a cable is connected to the electrode terminal 300 of the secondary battery pack 10 a connecting operation may be easily performed and a connecting structure may be simplified. For example, in a case where the secondary battery pack 10 is mounted in an electric vehicle, when the secondary battery pack 10 is to be repaired or replaced, access to the secondary battery pack 10 may be made downward from an upper portion of the secondary battery pack 10. Here, according to the configuration in which the electrode terminal 300 protrudes upward as in the above embodiment, an operator may easily perform a connecting operation of a cable to the electrode terminal 300 from the upper portion of the secondary battery pack 10.

The terminal cover 400 is attachable to and detachable from the terminal cover mounting parts 210*a* to cover an upper portion and a part of a side surface of the electrode terminal 300. That is, the electrode terminal 300 may protrude to the outer part of the pack case 200, and in this case, the terminal cover 400 may cover the electrode terminal 300 except for a part, so that only a part may be exposed outside and remaining part may not be exposed. In addition, an opening part of the terminal cover 400 may be used as a passage of a cable (not shown) connected to the electrode terminal 300.

According to the structure of the terminal cover 400, the exposure of the electrode terminal 300 to the outside may be reduced. Thus, problems caused by the exposure of the electrode terminal 300, e.g., contacting of a metal material to the electrode terminal 300 and occurrence of an internal short-circuit, spark, a fire, etc., may be effectively prevented.

Figure 4:
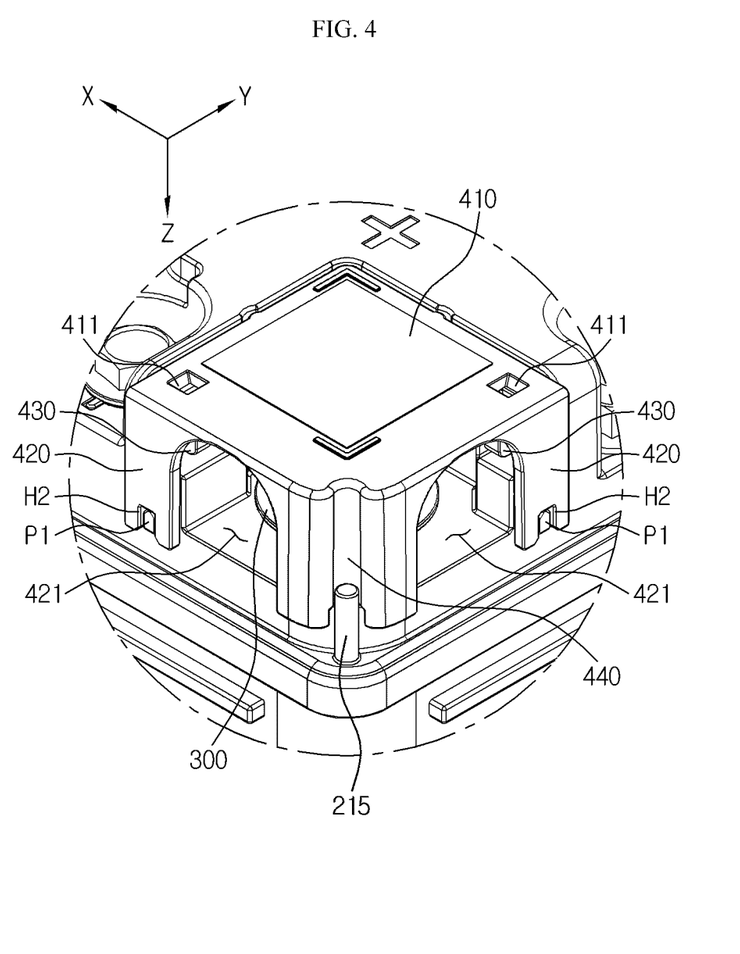
FIG. 4 is an enlarged perspective view of a part A of FIG. 1.
Figure 5:
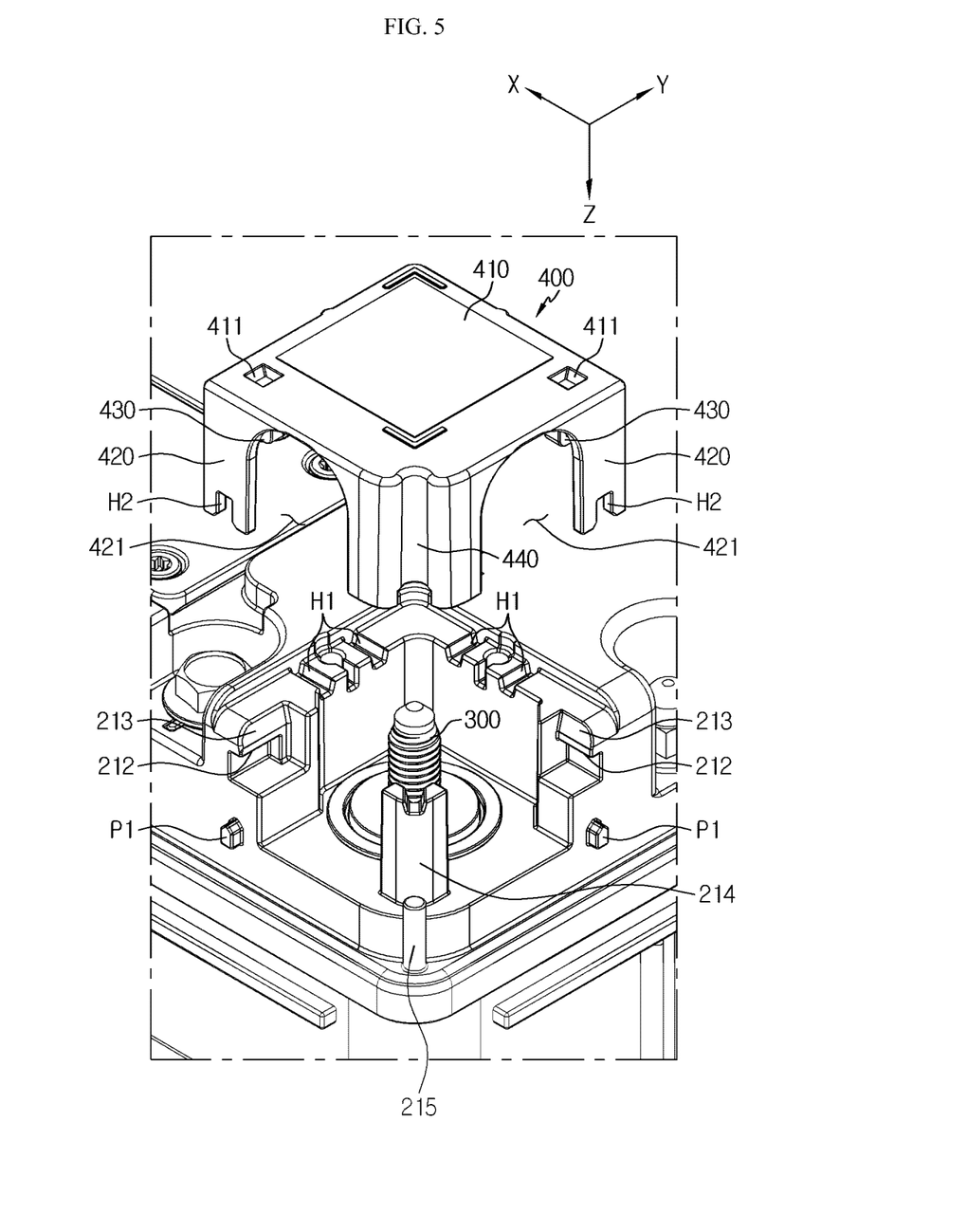
FIG. 5 is a diagram showing a state in which a terminal cover is separated in FIG. 4.
Figure 6:
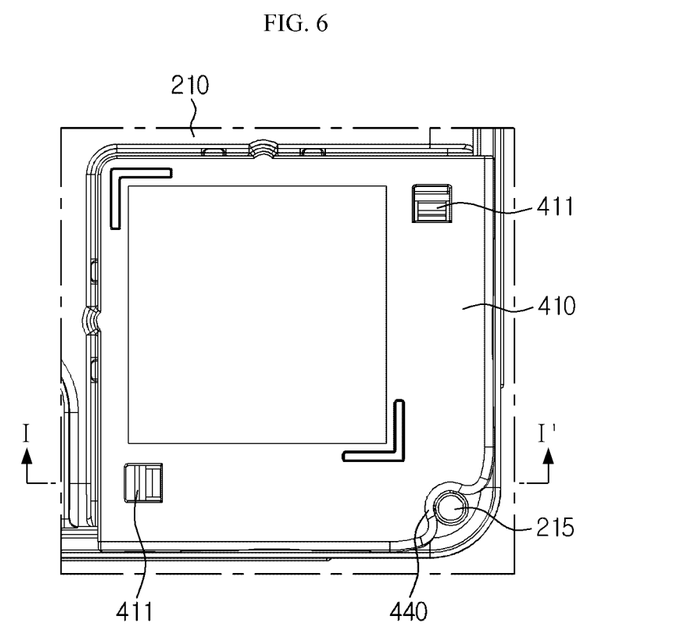
FIG. 6 is a top view of FIG. 4.
Figure 7:
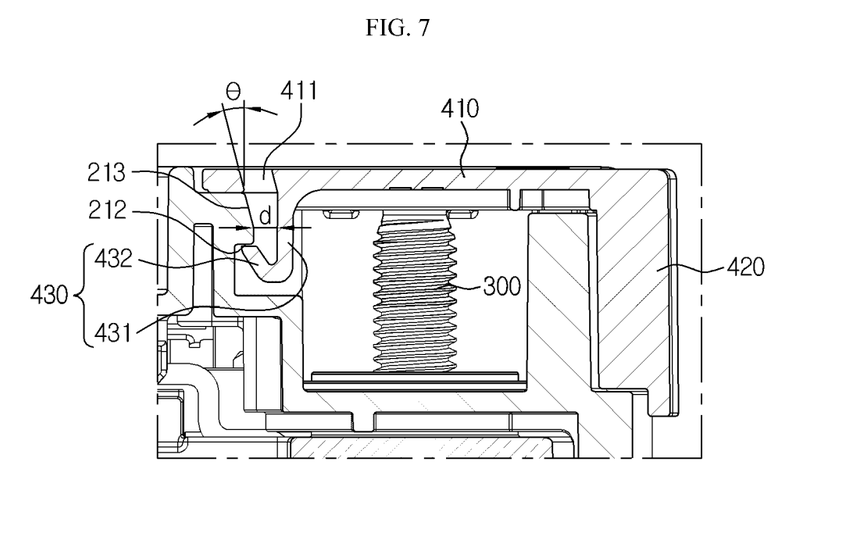
FIG. 7 is a cross-sectional view taken along a line I-I' of FIG. 6.

FIG. 4 is a partially enlarged perspective view of a part A of FIG. 1, FIG. 5 is a perspective view showing a state in which the terminal cover 400 is separated in FIG. 4, FIG. 6 is a top view of FIG. 4, and FIG. 7 is a cross-sectional view taken along a line I-I' of FIG. 6.

Referring to FIGS. 4 to 7, the configuration of the terminal cover 400 will be described in more detail, that is, the terminal cover 400 includes an upper plate 410 covering an upper part of the electrode terminal 300 and side plates 420 partially covering side surfaces of the electrode terminal 300. When the terminal cover 400 is coupled to the terminal cover mounting parts 210 of the upper case 210, the electrode terminal 300 may be shielded except for a front side surface and a right side surface thereof in the drawings. Here, the front side surface denotes a side surface right in front of the electrode terminal 300 and the right side surface is a side surface at right of the electrode terminal 300 when the secondary battery pack 10 is seen in a direction of an arrow B as shown in FIG. 1. A rear side surface and a left side surface of the electrode terminal 300 may be blocked by wall surfaces of the terminal cover mounting part 210*a*.

Each side plate 420 of the terminal cover 400 includes a cut portion 421 that is partially cut. In particular, as shown in FIG. 4, two cut portions 421 are provided in the terminal cover 400 in different directions. One of the two cut portions 421 may be used as a passage for the cable wiring, and at this time, the operator may select one of the cut portions 421, which is suitable for the operation of wiring the cable. For example, a location of another secondary battery pack 10 or an external device that has to be electrically connected to the secondary battery pack 10 in the drawings may be relatively changed, and thus an accessing direction or an extending direction of the cable for the electric connection between them may also vary. As an example, the terminal cover 400 includes the cut portions 421 respectively in the front side surface and the right side surface of the electrode terminal 300 in order to effectively deal with the variation in the cable connecting structure.

In the present embodiment, the upper plate 410 of the terminal cover 400 is formed as a square corresponding to an upper area of the terminal cover mounting part 210*a*, and the side plates 420 correspond to two outer surfaces and have a height corresponding to that of the wall surface. The terminal cover 400 may be attached to/detached from the terminal cover mounting part 210*a* in a longitudinal direction.

Hereinafter, attaching and detaching structure between the terminal cover 400 and the upper case 210 will be described in more detail below with reference to FIGS. 4 to 7.

The terminal cover mounting part 210*a* and the terminal cover 400 respectively include a stopper 212 and a hooking protrusion 430 that are configured to hook-coupled to each other. The stopper 212 may be provided by partially depressing inward the wall surface of the terminal cover mounting part 210*a*, as shown in FIG. 5. In addition, an inclined surface 213 is formed right on the stopper 212, and the inclined surface 213 guides the hooking protrusion 430 downward to be hook-coupled by the stopper 212 when the terminal cover 400 is attached.

The hooking protrusion 430 is located at an inner space of the side plates 420 of the terminal cover 400 to extend downward from the upper plate 410 of the terminal cover 400, and may be configured to be hooked by the stopper 212 from upper and lower portions of each other.

As shown in FIG. 7, the hooking protrusion 430 may include a supporter 431 spaced a predetermined distance d from the stopper 212 in a transverse direction and extending vertically downward from the upper plate 410 of the terminal cover 400, and a coupling portion 432 curved upward from an end of the supporter 431 in a direction towards the hooking protrusion 212 to contact the stopper 212. The hooking protrusion 430 is formed on the upper plate 410 of the terminal cover 400 as a cantilever, and the supporter 431 is elastic to be curved within a predetermined range by an external force.

Two stoppers 212 and two hooking protrusions 430 may be respectively provided on the terminal cover mounting part 210*a* and the terminal cover 400, and directions in which the two stoppers 430 are hook-coupled by the corresponding hooking protrusions 212 are different from each other. For example, two stoppers 212 may be respectively formed on two crossing wall surfaces of the terminal cover mounting part 210*a*, and one of the two hooking protrusions 430 corresponding to the stoppers 212 is coupled to one stopper 212 in an X-axis direction of FIG. 4 and the other hooking protrusion 430 is coupled to the other stopper 212 in a Y-axis direction of FIG. 4. Therefore, the hook-coupled states in the X-axis and Y-axis directions have to be unhooked at the same time to separate the terminal cover 400. That is, the terminal cover 400 may be stably fixed to the upper case 210 to protect the electrode terminal 300.

In addition, the present disclosure is not limited to the example, in which one stopper 212 is provided on one side wall of the terminal cover mounting part 210*a* and one hooking protrusion 430 corresponds to the stopper 212. That is, one or more pairs of stoppers 212 and hooking protrusions 430 may be respectively coupled to each other in different directions.

In the present embodiment, the terminal cover mounting part 210*a* includes at least one of a protrusion and a groove, and the terminal cover 400 includes at least one of a groove and a protrusion corresponding to those of the terminal cover mounting parts 210*a*.

For example, as shown in FIGS. 4 and 5, the terminal cover mounting part 210*a* may further include first protrusions P1 protruding from the external surface thereof, and second grooves H1 formed as concavo-convex structures along upper boundaries of the wall surfaces. In addition, first grooves H2 engaged with the first protrusions and second protrusions engaged with the second grooves may be respectively provided in lower ends of the side plates 420 and opposite side surfaces of the terminal cover 400, which are not seen in the drawings.

Through the engagement or concavo-convex coupling structure between the protrusions and the grooves of the terminal cover mounting part 210*a* and the terminal cover 400, the terminal cover 400 may be held by the upper case 210 and may be restricted to move back and forth, and to left and right.

Also, the terminal cover 400 may further include a concave portion 440 at a corner where the side plates 420 cross each other. Here, the concave portion 440 has a structure of being depressed or curved towards the inner portion of the terminal cover 400 between the two side plates 420.

In addition, the terminal cover mounting part 210*a* includes an internal column 214 that is located in an internal area of the terminal cover 400 based on the concave portion 440 to support the upper plate 410 of the terminal cover 400, and an external column 215 provided to be inserted to the concave portion 440 in a longitudinal direction at an outer part of the terminal cover 400.

The internal column 214 supports the upper plate 410 of the terminal cover 400 at the internal area of the terminal cover 400 to provide the terminal cover 400 with mechanical supporting force, and the external column 215 guides the mounting operation of the terminal cover 400 in the longitudinal direction and supports the terminal cover 400 at the outer part by being inserted into the internal space of the concave portion 440 to prevent the terminal cover 400 from moving in the transverse direction as shown in FIG. 6.

Also, the terminal cover 400 may further include a jig hole 411 in the upper plate 410 of the terminal cover 400. The jig hole 411 is a hole provided to guide insertion of a cover separating jig 700 from the outer part of the terminal cover 400 into the terminal cover 400. Here, the cover separating jig 700 (see FIG. 9) may be a bar-shaped tool for releasing the hooking protrusion 430 that has been hook-coupled in the internal area of the terminal cover 400 from the stopper 212.

For example, the hooking protrusion 430 may be separated from the stopper 212 when it is pushed by the cover separating jig 700 that is inserted through the jig hole 411, and the engagement in the longitudinal direction may be released. That is, two jig holes 411 are formed in the upper plate 410 of the terminal cover 400, and the cover separating jig 700 is inserted into each of the jig holes 411 to release the hook-coupling state of the hooking protrusion 430 from the stopper 212 and then the terminal cover 400 is lifted to be detached from the upper case 210.

Figure 8:
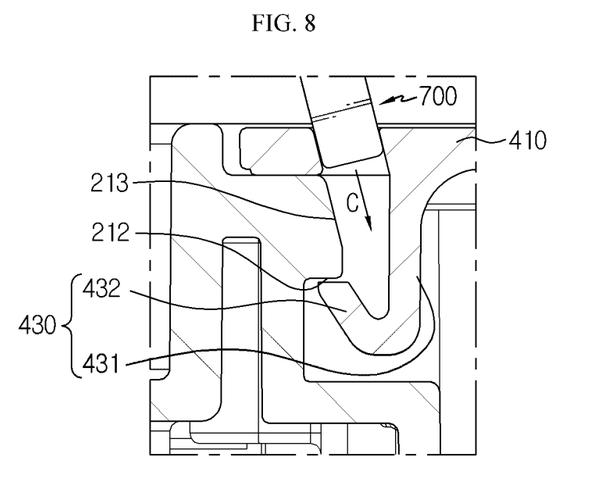
FIGS. 8 and 9 are partially enlarged views showing states before and after inserting a cover separating jig.
Figure 9:
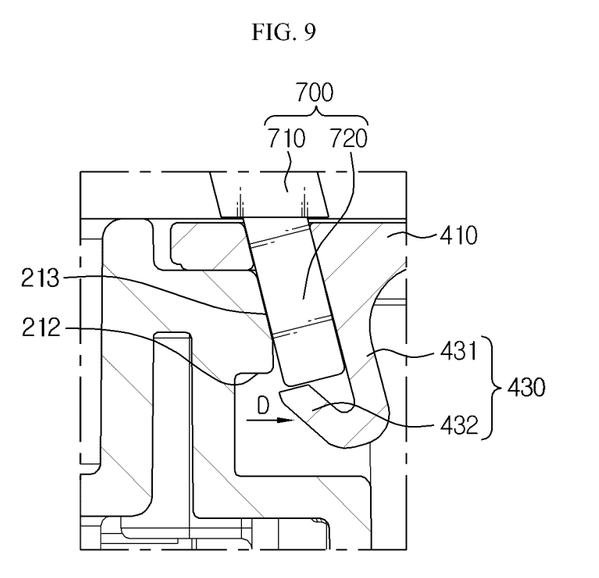

FIGS. 8 and 9 are partially enlarged views showing the terminal cover 400 before and after inserting the cover separating jig 700.

Referring to FIGS. 7 to 9, the jig hole 411 may be located above a coupling portion 432. The cover separating jig 700 may be introduced to the internal space of the terminal cover 400, that is, a space between the stopper 212 and the supporter 431 of the hooking protrusion 430, through the jig hole 411.

In addition, as shown in FIGS. 7 and 8, the jig hole 411 may be formed in the upper plate 410 of the terminal cover 400 to be inclined by a predetermined angle (θ) with respect to a vertical direction. For example, the upper plate 410 of the terminal cover 400 has a predetermined thickness, and the upper plate 410 is perforated in an inclined state by a predetermined angle to form the jig hole 411. Here, the inclined direction of the jig hole 411 may face the supporter 431 of the hooking protrusion 430.

According to the structure of the jig hole 411, as shown in FIGS. 8 and 9, the cover separating jig 700 may be inserted in a direction C to be inclined by a predetermined angle with respect to the upper plate 410, and the hooking protrusion 430 is elastically curved in a direction D and released from the stopper 212 when the cover separating jig 700 pushes the hooking protrusion 430.

The cover separating jig 700 may include a compressor 720 that may pass through the jig hole 411 and a head 710 that may not be inserted to the jig hole 411. That is, the compressor 720 is integrally formed with the head 710, and has a smaller cross-sectional area than the head 710. In addition, the jig hole 411 may have a diameter that only allows the compressor 720 to be inserted therein.

Also, a length of the compressor 720 may be determined to correspond to an elastic deformation value of the hooking protrusion 430, which makes the hooking protrusion 430 separated from the stopper 212. By restricting the length and the insertion depth of the compressor 720, an excessive power may not be applied to the hooking protrusion 430, and thereby damage on the components may be prevented.

As described above, according to the configuration of the terminal cover 400 according to the present disclosure, the pack case 200 and the terminal cover 400 may be easily attached to/detached from each other and a coupling force therebetween may be improved comparing with the related art, and thus, safety of the secondary battery pack 10 may be improved.

In particular, when the operator pushes the cover separating jig 700 into the jig hole 411 to a predetermined depth, the coupling state between the hooking protrusion 430 of the terminal cover 400 and the stopper 212 of the terminal cover mounting part 210a is to be released, and accordingly, a power having an accurate and appropriate strength may be applied to the coupling portion. Therefore, anyone may separate the terminal cover 400 from the pack case 200 without concerning about the breakdown of the components.

In addition, a vehicle according to the present disclosure may include the secondary battery pack 10 according to the present disclosure. The secondary battery pack 10 may be applied to a vehicle such as an electric vehicle or a hybrid car, and moreover, may be also applied to information technology (IT) products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

On the other hand, it is obvious to one of ordinary skill in the art that the terms used to indicate the direction as described herein, such as 'upper', 'lower', 'right' and 'left', are only for convenience of description, and may be differently expressed depending on a viewing position of a viewer or a location where an object is placed.

What is claimed is:

1. A secondary battery pack comprising:
   a cell assembly comprising a plurality of secondary batteries;
   a pack case having an internal space for accommodating the cell assembly;
   a first stopper provided in the pack case;
   an electrode terminal connected to the cell assembly and protruding to an outside of the pack case;
   a terminal cover configured to cover an upper portion and partial side surfaces of the electrode terminal, and to be detachable from the pack case, the terminal cover having a first corner formed by a first side edge and a second side edge;
   a first side plate extending downwardly at the first corner from the second side edge,
   a first hooking protrusion having an upper end at a connection point on a bottom surface of the terminal cover and a lower end, the connection point spaced from the first side edge of the terminal cover, the lower end of the first hooking protrusion configured to be hook-coupled to and released from the first stopper provided in the pack case; and
   a first jig hole formed in the terminal cover between the connection point of the first hooking protrusion and the first side edge, the first jig hole configured to allow a cover separating jig to be inserted from outside to inside, and the first hooking protrusion is provided at an internal area of the terminal cover to be released from the first stopper when the cover separating jig inserted through the first jig hole pushes the first hooking protrusion.

2. The secondary battery pack of claim 1, wherein the pack case comprises a terminal cover mounting part having a square-shaped upper surface and four corners, at least one of which is depressed,
   the electrode terminal is located on the terminal cover mounting part, and
   the terminal cover is coupled to the terminal cover mounting part.

3. The secondary battery pack of claim 2, wherein the terminal cover mounting part comprises a through hole provided in a vertical direction so that the electrode terminal protrudes to the outside, and
the terminal cover comprises an upper plate covering an upper portion of the electrode terminal.

4. The secondary battery pack of claim 3, wherein the first stopper is partially depressed inward from a wall surface of the terminal cover mounting part.

5. The secondary battery pack of claim 4, wherein the first stopper comprises two stoppers, respectively on two crossing wall surfaces of the terminal cover mounting part, and the first hooking protrusion comprises two hooking protrusions corresponding to the two stoppers and the two hooking protrusions are hook-coupled to the two stoppers in different directions.

6. The secondary battery pack of claim 4, wherein the first hooking protrusion and the first stopper are configured to be vertically hook-coupled to each other.

7. The secondary battery pack of claim 4, wherein an inclined surface that guides the first hooking protrusion downward to be hook-coupled to the first stopper is formed on an upper part of the first stopper.

8. The secondary battery pack of claim 4, wherein the first hooking protrusion comprises:
a supporter spaced a predetermined distance from the first stopper in a transverse direction and extending perpendicularly downward from the upper plate of the terminal cover; and
a coupling portion curved upward from an end of the supporter in a direction towards the first stopper to contact the first stopper,
wherein the first jig hole is located above the coupling portion.

9. The secondary battery pack of claim 8, wherein the first jig hole is formed in the upper plate to be inclined by a predetermined angle with respect to a vertical direction.

10. The secondary battery pack of claim 1 wherein the terminal cover mounting part comprises at least one of a protrusion and a groove, and the terminal cover comprises at least one of a groove and a protrusion corresponding to the terminal cover mounting part.

11. A secondary battery pack comprising:
a cell assembly comprising a plurality of secondary batteries;
a pack case having an internal space for accommodating the cell assembly;
a first stopper provided in the pack case;
an electrode terminal connected to the cell assembly and protruding to an outside of the pack case;
a terminal cover configured to cover an upper portion and partial side surfaces of the electrode terminal, and to be detachable from the pack case;
a first hooking protrusion extending downwardly from a bottom surface of the terminal cover and spaced from a side edge of the terminal cover, the first hooking protrusion configured to be hook-coupled to and released from the first stopper provided in the pack case; and
a first jig hole formed in the terminal cover between the first hooking protrusion and the first side edge, the first jig hole configured to allow a cover separating jig to be inserted from outside to inside, and the first hooking protrusion is provided at an internal area of the terminal cover to be released from the first stopper when the cover separating jig inserted through the first jig hole pushes the first hooking protrusion,
wherein the pack case comprises a terminal cover mounting part having a square-shaped upper surface and four corners, at least one of which is depressed,
the electrode terminal is located on the terminal cover mounting part, and
the terminal cover is coupled to the terminal cover mounting part,
further comprising a second side plate,
wherein the terminal cover comprises an upper plate covering an upper portion of the electrode terminal and an inwardly curved corner where the side plates cross each other and a concave portion extending downwardly from the inwardly curved corner, and
the terminal cover mounting part comprises a through hole provided in a vertical direction so that the electrode terminal protrudes to the outside and an internal column located at an internal area of the terminal cover based on the concave portion to support the upper plate of the terminal cover, and an external column provided to be inserted in the concave portion in a longitudinal direction from an outer part of the terminal cover.

12. The secondary battery pack of claim 1, wherein the electrode terminal comprises a positive electrode terminal and a negative electrode terminal, and the terminal cover comprises two terminal covers respectively covering the positive electrode terminal and the negative electrode terminal.

13. The secondary battery pack of claim 1, wherein the cover separating jig comprises a head and a compressor extending from the head and having a smaller cross-sectional area than the head, and
the first jig hole is equal to or greater than a cross-sectional area of the compressor and smaller than a cross-sectional area of the head.

14. A vehicle comprising the secondary battery pack according to claim 1.

15. The secondary battery pack of claim 1, wherein at least one side plate has a groove engaging a protrusion on the pack case.

16. The secondary battery pack of claim 1, further comprising:
a second stopper provided in the pack case;
a second corner formed by a third side edge and a fourth side edge of the terminal cover;
a second side plate extending downwardly from the fourth side edge at the second corner, the second side plate extending from the second corner by a second distance;
a second hooking protrusion extending downwardly from the bottom surface of the terminal cover and spaced from the third side edge of the terminal cover by less than the second distance, the second hooking protrusion configured to be hook-coupled to and released from the second stopper provided in the pack case; and
a second jig hole formed in the terminal cover between the second hooking protrusion and the third side edge.

* * * * *